United States Patent
Motto

(10) Patent No.: US 8,651,240 B1
(45) Date of Patent: Feb. 18, 2014

(54) PRESSURIZED RESERVE LUBRICATION SYSTEM FOR A GAS TURBINE ENGINE

(71) Applicant: United Technologies Corporation, Hartford, CT (US)

(72) Inventor: David L. Motto, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/726,435

(22) Filed: Dec. 24, 2012

(51) Int. Cl.
*F16N 29/04* (2006.01)

(52) U.S. Cl.
USPC ......................................................... 184/7.4

(58) Field of Classification Search
USPC .................. 184/6.11, 6.12, 27.1, 36, 4, 7.4
See application file for complete search history.

(56) References Cited

U.S. PATENT DOCUMENTS

| | | | |
|---|---|---|---|
| RE29,299 E | 7/1977 | Estes et al. | |
| 4,037,687 A | 7/1977 | Krutz et al. | |
| 4,077,220 A | 3/1978 | Matthews | |
| 4,284,174 A | 8/1981 | Salvana et al. | |
| 4,286,614 A | 9/1981 | Kacal et al. | |
| 4,373,421 A | 2/1983 | Camboulives et al. | |
| 4,407,382 A | 10/1983 | Dziuba et al. | |
| 4,466,399 A | 8/1984 | Hinz et al. | |
| 4,507,926 A | 4/1985 | Teckentrup et al. | |
| 4,563,012 A | 1/1986 | Zimmermann et al. | |
| 4,630,712 A | 12/1986 | Hoseley | |
| 4,697,414 A | 10/1987 | McCarty | |
| 4,709,785 A | 12/1987 | Csanady, Jr. | |
| 4,717,000 A | 1/1988 | Waddington et al. | |
| 4,741,155 A | 5/1988 | McCarty | |
| 4,957,475 A | 9/1990 | Kreill | |
| 4,976,335 A | 12/1990 | Cappellato | |
| 5,018,601 A | 5/1991 | Waddington et al. | |
| 5,097,926 A | 3/1992 | Duello | |
| 5,121,815 A | 6/1992 | Francois et al. | |
| 5,314,717 A | 5/1994 | Alt | |
| 5,344,101 A | 9/1994 | Francois | |
| 5,445,748 A | 8/1995 | Holinski | |
| 5,553,694 A | 9/1996 | Schulz et al. | |
| 5,575,865 A | 11/1996 | Isenberg et al. | |
| 5,722,519 A | 3/1998 | Kirchhoffer et al. | |
| 5,843,283 A | 12/1998 | Henssler et al. | |
| 6,736,403 B2 | 5/2004 | Kreutzer | |
| 7,216,473 B1 * | 5/2007 | McArthur et al. | 60/39.08 |
| 7,387,189 B2 | 6/2008 | James et al. | |
| 7,871,248 B2 * | 1/2011 | Delaloye | 417/28 |
| 7,946,389 B2 * | 5/2011 | Kakinami et al. | 184/27.2 |
| 7,946,402 B2 | 5/2011 | Gassmann et al. | |
| 8,020,665 B2 | 9/2011 | Sheridan et al. | |
| 8,162,630 B2 | 4/2012 | Platt | |
| 8,171,815 B2 | 5/2012 | Paluncic et al. | |
| 8,210,751 B2 | 7/2012 | Streit et al. | |
| 8,215,454 B2 | 7/2012 | Portlock et al. | |
| 2006/0081419 A1 * | 4/2006 | Care et al. | 184/6.11 |
| 2008/0116010 A1 * | 5/2008 | Portlock et al. | 184/6.12 |
| 2010/0252367 A1 * | 10/2010 | Prior | 184/36 |
| 2011/0168495 A1 * | 7/2011 | Subramaniam et al. | 184/6.12 |
| 2011/0303491 A1 * | 12/2011 | Jenkins | 184/7.4 |

* cited by examiner

*Primary Examiner* — Michael Mansen
*Assistant Examiner* — Robert T Reese

(57) ABSTRACT

A lubrication system includes a control subsystem operable to selectively communicate lubricant under gas pressure from a pressurized reserve lubricant tank in response to a prolonged reduced-G condition.

20 Claims, 7 Drawing Sheets

PRESSURIZED RESERVE LUBRICATION SYSTEM FOR A GAS TURBINE ENGINE

BACKGROUND

The present disclosure relates to a lubrication system for a gas turbine engine and, more particularly, to a lubrication system that remains operable in reduced gravity (reduced-G) conditions.

Aircraft gas turbine engines include a lubrication system to supply lubrication to various components. A reserve is also desirable to ensure that at least some components are not starved of lubricant during reduced-G conditions in which acceleration due to gravity is partially or entirely counteracted by aircraft maneuvers and/or orientation.

SUMMARY

A lubrication system according to one disclosed non-limiting embodiment of the present disclosure includes a reserve lubrication subsystem including a pressurized reserve lubricant tank and a control subsystem operable to selectively communicate lubricant under gas pressure from said pressurized reserve lubricant tank in response to a prolonged reduced-G condition.

In a further embodiment of the foregoing embodiment, the pressurized reserve lubricant tank is in communication with a Fan Drive Gear System.

In a further embodiment of any of the foregoing embodiments, the system further comprises a main lubricant tank solenoid valve in communication with the control subsystem. In the alternative or additionally thereto, in the foregoing embodiment the control subsystem is operable to close the main lubricant tank solenoid valve in response to the prolonged reduced-G condition.

In a further embodiment of any of the foregoing embodiments, the system further comprises a reserve lubricant tank solenoid valve in communication with the control subsystem. In the alternative or additionally thereto, in the foregoing embodiment the control subsystem is operable to open the reserve lubricant tank solenoid valve in response to the prolonged reduced-G condition.

In a further embodiment of any of the foregoing embodiments, the system includes a main lubricant tank solenoid valve in communication with the control subsystem, the control subsystem is operable to close the main lubricant tank solenoid valve in response to the prolonged reduced-G condition and a reserve lubricant tank solenoid valve in communication with the control subsystem, the control subsystem is operable to open the reserve lubricant tank solenoid valve in response to the prolonged reduced-G condition. In the alternative or additionally thereto, in the foregoing embodiment the control subsystem is operable to close the main lubricant tank solenoid valve and open the reserve lubricant tank solenoid valve after a predetermined time of the prolonged reduced-G condition.

In a further embodiment of any of the foregoing embodiments, the pressurized reserve lubricant tank is in a nacelle.

In a further embodiment of any of the foregoing embodiments, the pressurized reserve lubricant tank is in an engine pylori.

In a further embodiment of any of the foregoing embodiments, the pressurized reserve lubricant tank is in an aircraft wing.

In a further embodiment of any of the foregoing embodiments, the system comprises a multiple of pressurized reserve lubricant tanks.

In a further embodiment of any of the foregoing embodiments, the pressurized reserve lubricant tank is in communication with a journal pin of a Fan Drive Gear System.

A lubrication system according to another disclosed non-limiting embodiment of the present disclosure includes a main lubrication subsystem in communication with a Fan Drive Gear System, a reserve lubrication subsystem including a pressurized reserve lubricant tank in communication with said Fan Drive Gear System and a control subsystem operable to selectively communicate lubricant under gas pressure from said pressurized reserve lubricant tank in response to a reduced-G condition.

In a further embodiment of the foregoing embodiment, the system comprises a main lubricant tank solenoid valve in communication with said control subsystem, said control subsystem is operable to close said main lubricant tank solenoid valve in response to the prolonged reduced-G condition and a reserve lubricant tank solenoid valve in communication with said control subsystem, said control subsystem is operable to open said reserve lubricant tank solenoid valve in response to the prolonged reduced-G condition.

In a further embodiment of any of the foregoing embodiments, the control subsystem is operable to close said main lubricant tank solenoid valve and open said reserve lubricant tank solenoid valve after a predetermined time of the prolonged reduced-G condition.

A method of reducing lubrication starvation from a lubrication system in communication with a geared architecture for a gas turbine engine according to another disclosed non-limiting embodiment of the present disclosure includes communicating lubricant under gas pressure in response to a prolonged reduced-G condition.

In a further embodiment of the foregoing embodiment, the method comprises identifying an acceleration of gravity less than 1G.

In a further embodiment of any of the foregoing embodiments, the method includes communicating lubricant under gas pressure in response to the prolonged reduced-G condition after a predetermined time period.

In a further embodiment of any of the foregoing embodiments, the method includes sequentially communicating lubricant under gas pressure from each of a multiple of pressurized reserve lubricant tanks.

In a further embodiment of any of the foregoing embodiments, the method includes communication of the lubricant under gas pressure to a journal pin of the geared architecture.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
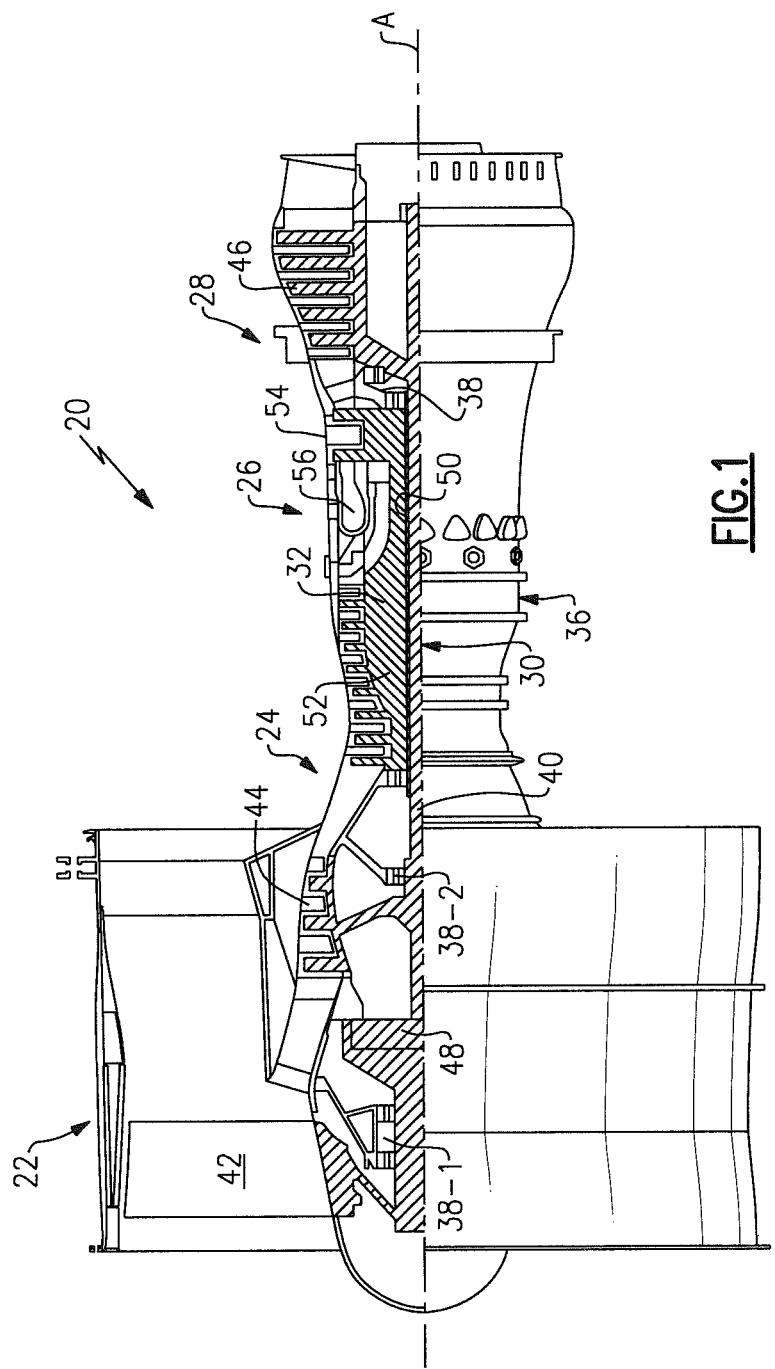
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the LPC and HPC and an intermediate pressure turbine (IPT) between the HPT and LPT.

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 through a geared architecture 48 to drive the fan 42 at a lower speed than the low spool 30.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 then the high pressure compressor 52, mixed with the fuel and burned in the combustor 56, then expanded over the high pressure turbine 54 and the low pressure turbine 46. The turbines 54, 46 rotationally drive the respective low spool 30 and high spool 32 in response to the expansion.

In one non-limiting example, the gas turbine engine 20 is a high-bypass geared architecture engine in which the bypass ratio is greater than about six (6:1). The geared architecture 48 can include an epicyclic gear train, such as a planetary gear system, star gear system or other gear system. The example epicyclic gear train has a gear reduction ratio of greater than about 2.3, and in another example is greater than about 2.5. The geared turbofan enables operation of the low spool 30 at higher speeds which can increase the operational efficiency of the low pressure compressor 44 and low pressure turbine 46 and render increased pressure in a fewer number of stages.

A pressure ratio associated with the low pressure turbine 46 is pressure measured prior to the inlet of the low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $(``T"/518.7)^{0.5}$. in which "T" represents the ambient temperature in degrees Rankine. The Low Corrected Fan Tip Speed according to one non-limiting embodiment of the example gas turbine engine 20 is less than about 1150 fps (351 m/s).

Figure 2:
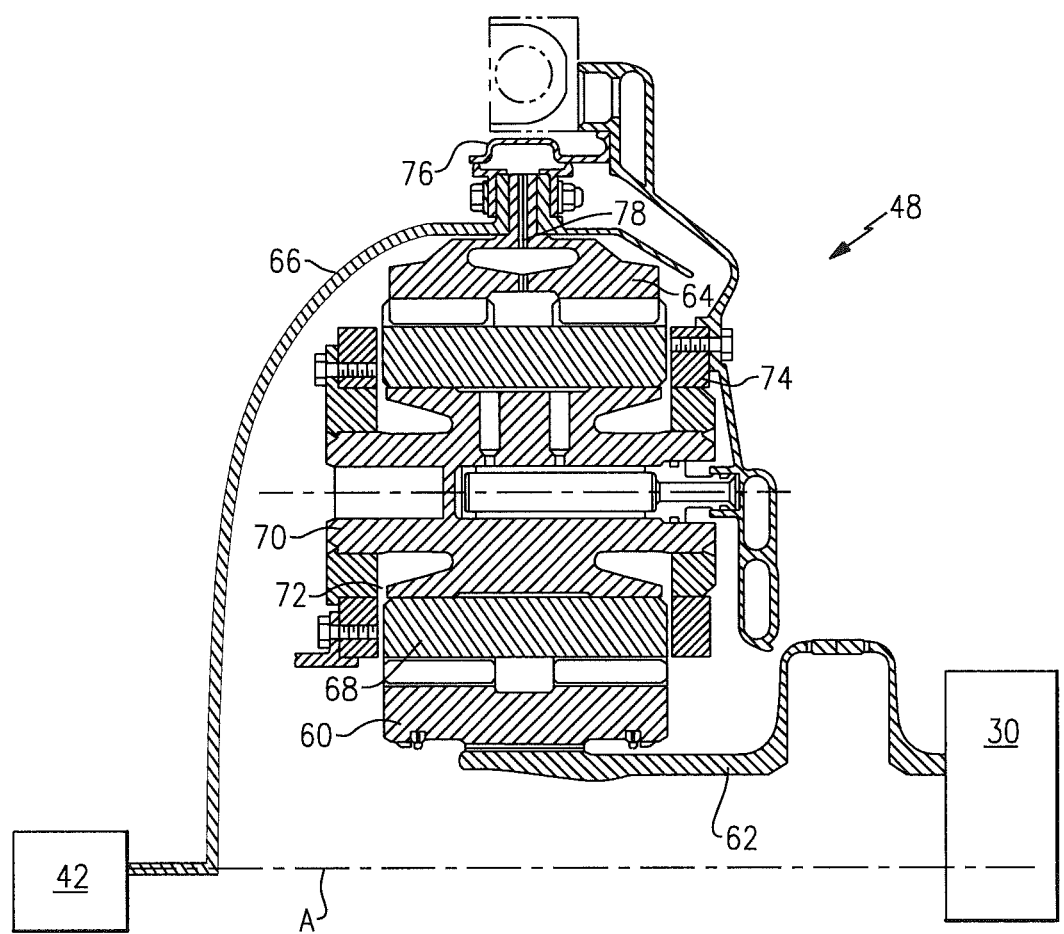
FIG. 2 is a cross sectional side elevation view of a gear train useful in an aircraft gas turbine engine.

With reference to FIG. 2, the geared architecture 48 includes a sun gear 60 driven by a sun gear input shaft 62 from the low speed spool 30, a ring gear 64 connected to a ring gear output shaft 66 to drive the fan 42 and a set of intermediate gears 68 in meshing engagement with the sun gear 60 and ring gear 64. Each intermediate gear 68 is mounted about a journal pin 70 which are each respectively supported by a carrier 74. A replenishable film of lubricant, not shown, is supplied to an annular space 72 between each intermediate gear 68 and the respective journal pin 70.

A lubricant recovery gutter 76 is located around the ring gear 64. The lubricant recovery gutter 76 may be radially arranged with respect to the engine central longitudinal axis A. Lubricant is supplied thru the carrier 74 and into each journal pin 70 to lubricate and cool the gears 60, 64, 68 of the geared architecture 48. Once communicated through the geared architecture the lubricant is radially expelled thru the lubricant recovery gutter 76 in the ring gear 64 by various paths such as lubricant passage 78.

The input shaft 62 and the output shaft 66 counter-rotate as the sun gear 60 and the ring gear 64 are rotatable about the engine central longitudinal axis A. The carrier 74 is grounded and non-rotatable even though the individual intermediate gears 68 are each rotatable about their respective axes 80. Such a system may be referred to as a star system. It should be appreciated that various alternative and additional configurations of gear trains such as planetary systems may also benefit herefrom.

Many gear train components readily tolerate lubricant starvation for various intervals of time, however, the journal pins 70 may be relatively less tolerant of lubricant starvation. Accordingly, whether the gear system is configured as a star, a planetary or other relationship, it is desirable to ensure that lubricant flows to the journal pins 70, at least temporarily under all conditions inclusive of reduced-G conditions which may arise from aircraft maneuvers and/or aircraft orientation. As defined herein, reduced-G conditions include negative-G, zero-G, and positive-G conditions materially less than 9.8 meters/sec./sec. (32 feet/sec./sec.).

Figure 3:
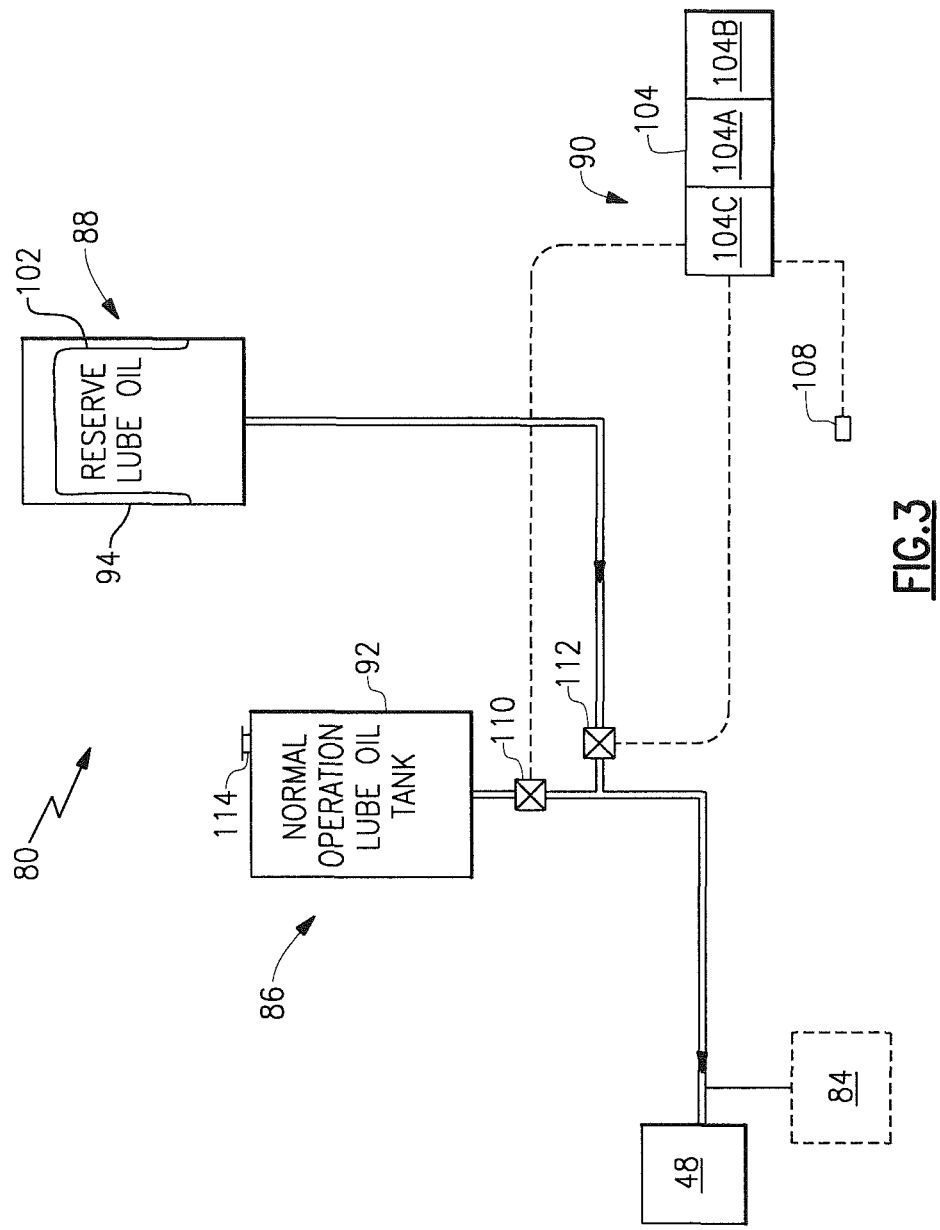
FIG. 3 is a schematic diagram of a lubrication system.

With Reference to FIG. 3, a lubrication system 80 is schematically illustrated in block diagram form for the geared architecture 48 as well as other components 84 (illustrated schematically) which may require lubrication. It should be appreciated that the lubrication system 80 is but a schematic illustration and is simplified in comparison to an actual lubrication system. The lubrication system 80 generally includes a main lubrication subsystem 86, a reserve lubrication subsystem 88 and a control subsystem 90.

The main lubrication subsystem 86 generally includes a main lubricant tank 92 which is a source of lubricant to the geared architecture 48. It should be understood that although not shown, the main lubrication subsystem 86 may include numerous other components such as a sump, scavenge pump, main pump and various lubricant reconditioning components such as chip detectors, heat exchangers and deaerators, which need not be described in detail herein.

Figure 4:
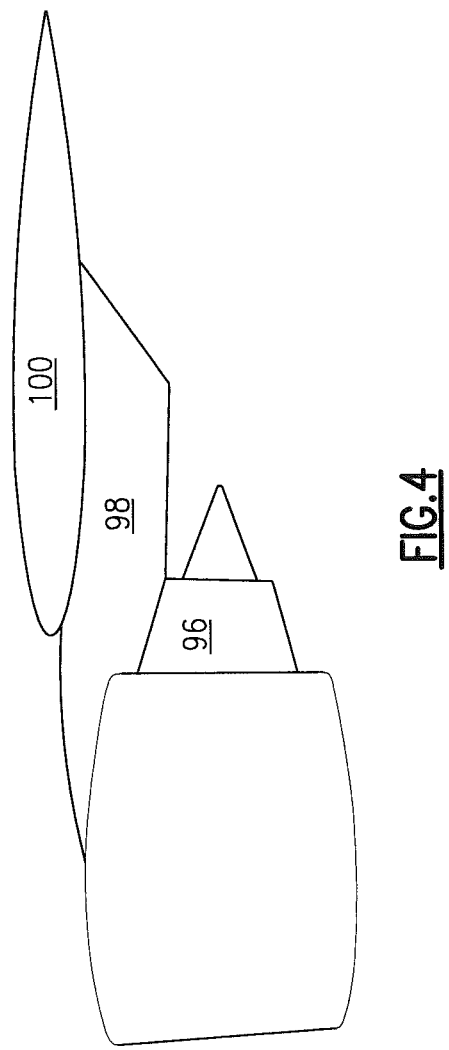
FIG. 4 is a schematic diagram of an example a gas turbine engine operable with a lubrication system according to any of the disclosed non-limiting embodiment.

The reserve lubrication subsystem 88 generally includes a pressurized reserve lubricant tank 94 and may also include numerous other components which need not be described in detail herein. The pressurized reserve lubricant tank 94 may be located remote from the main lubricant tank 92 such as, for example, within the engine nacelle 96, an engine pylon 98 or wing 100 (FIG. 4). It should be appreciated that the pressurized reserve lubricant tank 94 may provide less lubricant volume than the main lubricant tank 92. In one disclosed non-limiting embodiment, the pressurized reserve lubricant tank 94 may provide approximately fifty percent (50%) of the volume of the main lubricant tank 92. In another disclosed non-limiting embodiment, the pressurized reserve lubricant tank 94 may sized to provide lubricant only to specific components such as the journal pins 70.

The pressurized reserve lubricant tank 94 may be pressurized with an inert gas such as nitrogen. A flexible barrier 102 may be located to separate the nitrogen from the lubricant to prevent intermixture thereof. It should be appreciated that other pressurization systems such as a separate pressure source, or other flexible barrier arrangement may alternatively or additionally be provided.

The control subsystem 90 generally includes a control module 104 that executes a reserve lubricant supply logic 106 (FIG. 4). The functions of the logic 106 are disclosed in terms of functional block diagrams, and it should be understood by those skilled in the art with the benefit of this disclosure that these functions may be enacted in either dedicated hardware circuitry or programmed software routines capable of execution in a microprocessor based electronics control embodiment. In one non-limiting embodiment, the control module 104 may be a portion of a flight control computer, a portion of a Full Authority Digital Engine Control (FADEC), a stand-alone unit or other system.

The control module 104 typically includes a processor 104A, a memory 104B, and an interface 104C. The processor 104A may be any type of known microprocessor having desired performance characteristics. The memory 104B may be any computer readable medium which stores data and control algorithms such as logic 106 as described herein. The interface 104C facilitates communication with other components such as an accelerometer 108, a main lubricant tank valve 110 and a reserve lubricant tank valve 112. It should be appreciated that various other components such as sensors, actuators and other subsystems may be utilized herewith.

The lubrication system 80 is operable in both normal G-operation and reduced-G operation. During normal G-operation, the main lubricant tank 92 operates as the source of lubricant to the geared architecture 48. Although effective during normal-G operation, it may be desirable to extend such operability to reduced-G operation to assure that the geared architecture 48 will always receive an effective lubrication supply irrespective of the lubrication pump (not shown) being unable to generate proper pressure.

Figure 5:
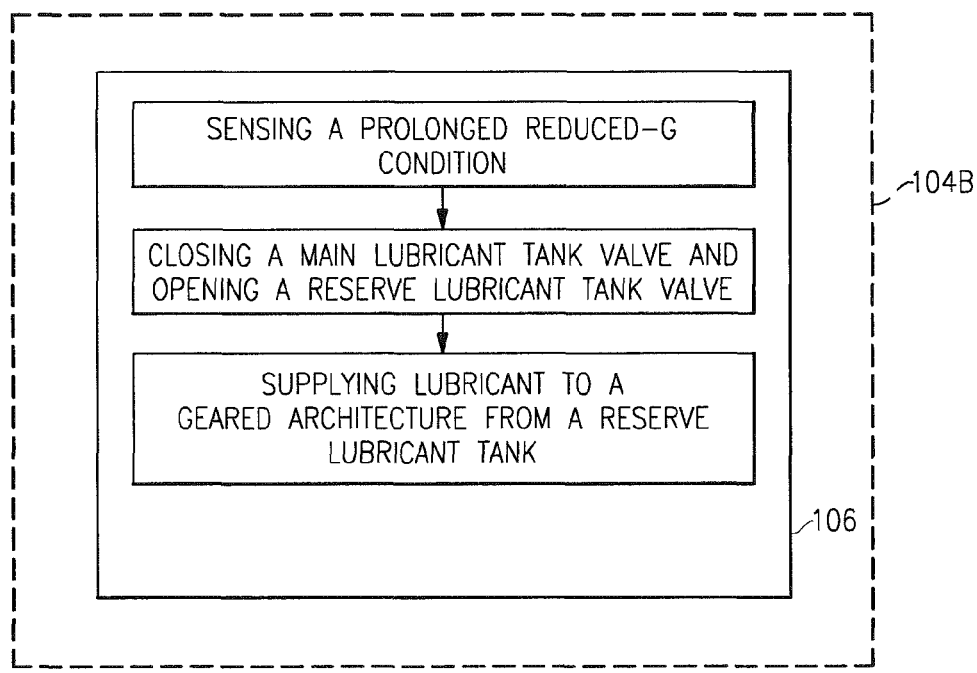
FIG. 5 is a block diagram of a control module that executes a reserve lubricant supply logic.

Under reduced-G operation, the accelerometer 108 will sense this condition and communicate same to the control module 104. The reserve lubricant supply logic 106 (FIG. 5) will then identify whether a prolonged reduced-G condition exists. A "prolonged reduced-G condition" is defined herein as a condition that lasts a length of time greater than a transient condition during which G forces are below gravity, e.g., 1G. In one disclosed non-limiting embodiment, the reserve lubricant supply logic 106 identifies a specific continuous time period during which the engine 20 is subject to the reduced-G condition such as, for example only, seven (7) seconds. It should be appreciated that other time periods as well as additional or alternative conditions may be utilized to further refine the logic.

After the predetermined time period, the reserve lubricant supply logic 106 closes the main lubricant tank valve 110 and opens the reserve lubricant tank valve 112. The main lubricant tank valve 110 is thereby isolated and the pressurized reserve lubricant tank 94 provides lubricant under gas pressure to the geared architecture 48 irrespective of the reduced-G condition. The geared architecture 48 is thereby assured an effective lubrication supply.

After the reduced-G condition passes, the main lubricant tank valve 110 is opened to again supply lubricant to the geared architecture 48. The reserve lubricant tank valve 112 may remain open as even if too much lubricant is then supplied, the excess lubricant can escape via an overflow vent 114. That is, the additional lubricant is cycled through the system or otherwise removed therefrom.

Figure 6:
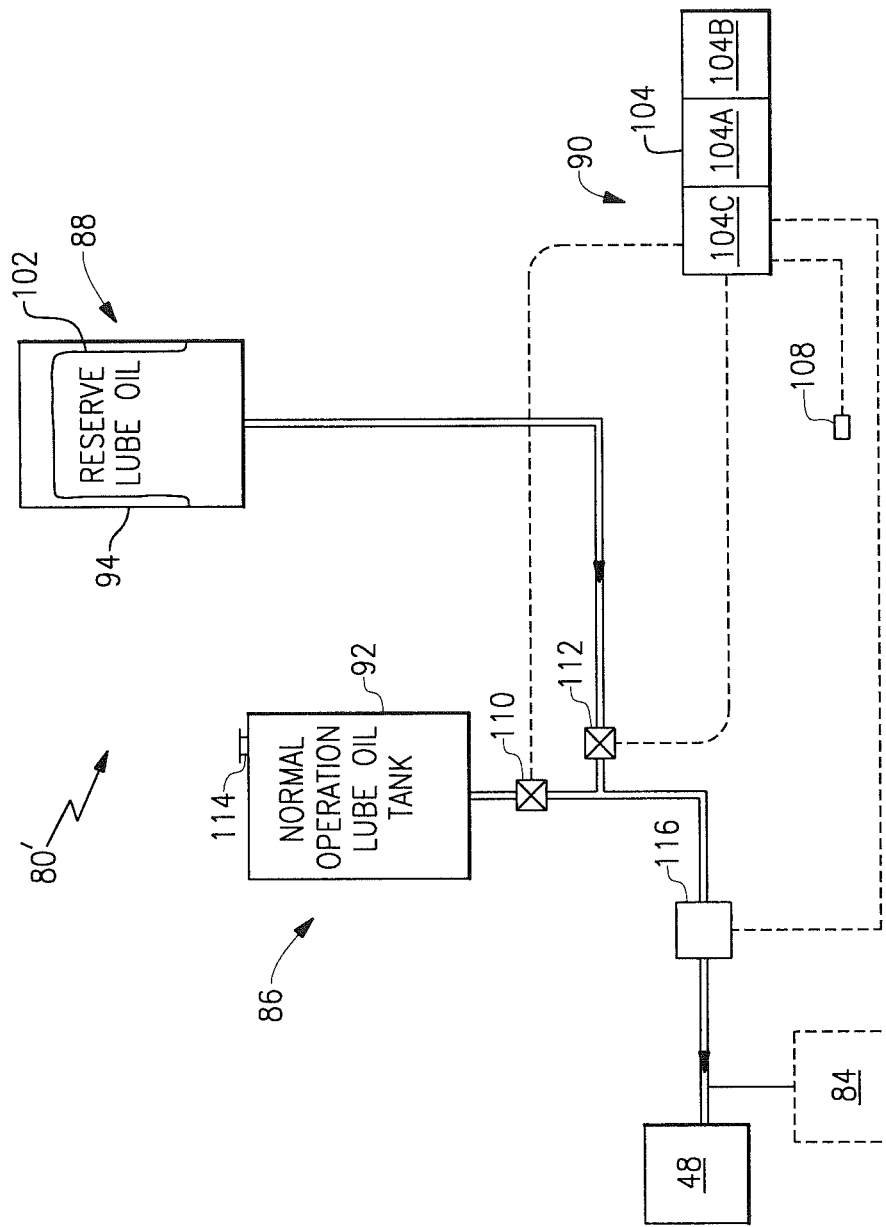
FIG. 6 is a schematic diagram of a lubrication system according to another disclosed non-limiting embodiment.

With reference to FIG. 6, another disclosed non-limiting embodiment of a lubrication system 80' alternatively or additionally includes other sensors such as a lubricant flow sensor 116. The flow sensor 116 communicates with the control module 104 to identify a prolonged reduced-G condition through identification of a reduced flow of lubricant to the geared architecture 48. That is, the flow sensor 116 identifies a below desired lubricant flow to the geared architecture irrespective of the G forces. It should be appreciated that flow sensor 116 may be used in addition or in the alternative to the accelerometer 108.

Figure 7:
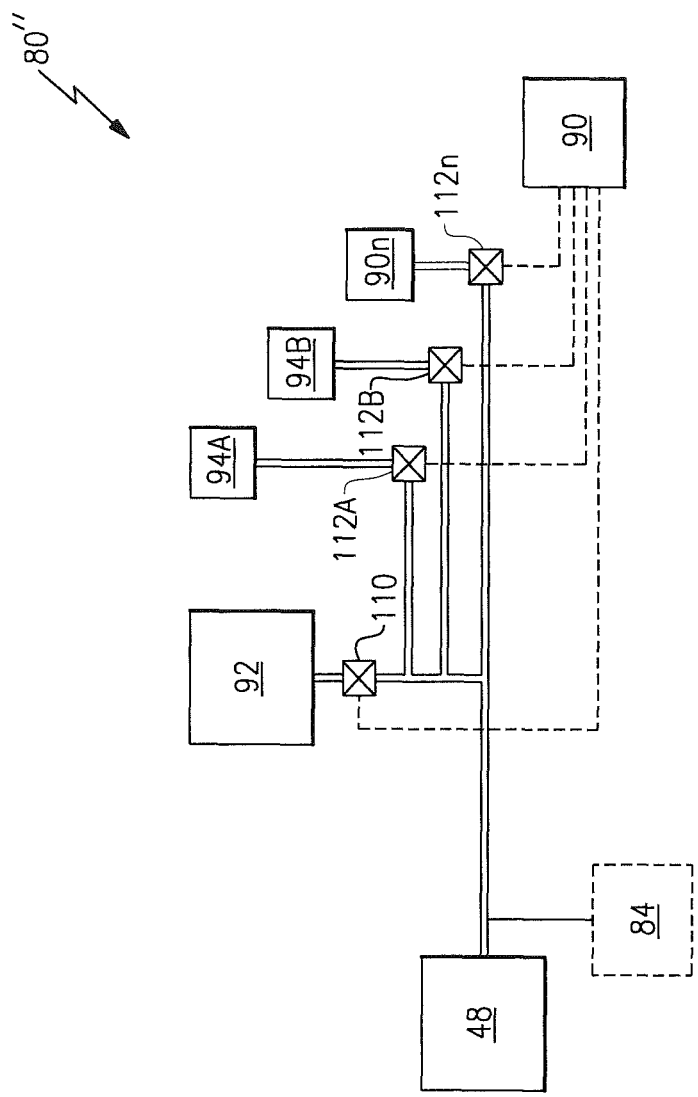
FIG. 7 is a schematic diagram of a lubrication system according to another disclosed non-limiting embodiment.

With reference to FIG. 7, another disclosed non-limiting embodiment of a lubrication system 80" provides a multi-shot system in which a multiple of pressurized reserve lubricant tanks 94A, 94B, . . . , 94n communicate with the geared architecture 48 through respective solenoid valves 112A, 112B, . . . , 112n. The solenoid valves 112A, 112B, . . . , 112n are respectively actuated as described above to provide a multi-shot system which may be sequentially activated should multiple reduced-G conditions occur.

Once used, the empty pressurized reserve lubricant tank(s) are then replaced or recharged in a maintenance operation once the aircraft has landed. For example, the pressurized reserve lubricant tank 94 may essentially be a line-replaceable unit that need only be plugged into the lubricant system for replacement. Furthermore, as the pressurized reserve lubricant tank 94 may be located in various locations (FIG. 4), maintenance access is readily achieved.

It should be understood that relative positional terms such as "forward," "aft," "upper," "lower," "above," "below," "bottom", "top", and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A lubrication system, comprising:
   a main lubrication subsystem;
   a reserve lubrication subsystem including a pressurized reserve lubricant tank; and
   a control subsystem operable to selectively communicate lubricant under gas pressure from said pressurized reserve lubricant tank to supplement lubricant from said main lubrication subsystem in response to a sensor operable to identify a prolonged reduced-G condition.

2. The lubrication system as recited in claim 1, wherein said pressurized reserve lubricant tank is in communication with a Fan Drive Gear System of a geared architecture gas turbine engine.

3. The lubrication system as recited in claim 1, further comprising a main lubricant tank solenoid valve in communication with said control subsystem and said main lubrication subsystem.

4. The lubrication system as recited in claim 3, wherein said control subsystem is operable to close said main lubricant tank solenoid valve in response to the prolonged reduced-G condition.

5. The lubrication system as recited in claim 4, further comprising a reserve lubricant tank solenoid valve in communication with said control subsystem.

6. The lubrication system as recited in claim 5, wherein said control subsystem is operable to open said reserve lubricant tank solenoid valve in response to the prolonged reduced-G condition.

7. The lubrication system as recited in claim 1, further comprising:
   a main lubricant tank solenoid valve in communication with said control subsystem and said main lubrication subsystem, said control subsystem is operable to close said main lubricant tank solenoid valve in response to the prolonged reduced-G condition; and
   a reserve lubricant tank solenoid valve in communication with said control subsystem, said control subsystem is operable to open said reserve lubricant tank solenoid valve in response to the prolonged reduced-G condition.

8. The lubrication system as recited in claim 7, wherein said control subsystem is operable to close said main lubricant tank solenoid valve and open said reserve lubricant tank solenoid valve after a predetermined time of the prolonged reduced-G condition.

9. The lubrication system as recited in claim 1, wherein said pressurized reserve lubricant tank is in a nacelle.

10. The lubrication system as recited in claim 1, wherein said pressurized reserve lubricant tank is in an engine pylori.

11. The lubrication system as recited in claim 1, wherein said pressurized reserve lubricant tank is in an aircraft wing.

12. The lubrication system as recited in claim 1, further comprising a multiple of pressurized reserve lubricant tanks.

13. The lubrication system as recited in claim 1, wherein said pressurized reserve lubricant tank is in communication with a journal pin of a Fan Drive Gear System of a geared architecture gas turbine engine.

14. A lubrication system, comprising:
   a main lubrication subsystem in communication with a Fan Drive Gear System of a geared architecture gas turbine engine;
   a reserve lubrication subsystem including a pressurized reserve lubricant tank in communication with said Fan Drive Gear System; and
   a control subsystem operable to selectively communicate lubricant under gas pressure from said pressurized reserve lubricant tank in response to a sensor operable to identify a prolonged reduced-G condition.

15. The lubrication system as recited in claim 14, further comprising:
   a main lubricant tank solenoid valve in communication with said control subsystem, said control subsystem is operable to close said main lubricant tank solenoid valve in response to the prolonged reduced-G condition; and
   a reserve lubricant tank solenoid valve in communication with said control subsystem, said control subsystem is operable to open said reserve lubricant tank solenoid valve in response to the prolonged reduced-G condition.

16. The lubrication system as recited in claim 15, wherein said control subsystem is operable to close said main lubricant tank solenoid valve and open said reserve lubricant tank solenoid valve after a predetermined time of the prolonged reduced-G condition.

17. A method of reducing lubrication starvation from a lubrication system with a main lubrication subsystem and a reserve lubrication subsystem, the main lubrication system in communication with a Fan Drive Gear System of a geared architecture gas turbine engine, comprising: lubricating the Fan Drive Gear System by the main lubrication subsystem; communicating lubricant under gas pressure from the reserve lubrication subsystem to supplement the main lubrication subsystem in response to the identification of a gravitational acceleration of less than 1 G.

18. The method as recited in claim 17, further comprising:
   communicating lubricant under gas pressure from the reserve lubrication subsystem in response to the continuous identification of a reading of a gravitational acceleration of less than 1G after a predetermined time period.

19. The method as recited in claim 17, further comprising:
   sequentially communicating lubricant under gas pressure from each of a multiple of pressurized reserve lubrication tanks in the reserve lubrication subsystem.

20. The method as recited in claim 17, further comprising:
   communicating the lubricant under gas pressure from the reserve lubrication subsystem to a journal pin of the geared architecture.

* * * * *